(12) United States Patent
Makotinsky

(10) Patent No.: US 7,086,163 B1
(45) Date of Patent: Aug. 8, 2006

(54) METHOD AND REMOTE-CONTROLLED REFLECTOR DEVICE FOR LAYOUT AXIS LINES DURING CONSTRUCTION OF A BUILDING IN THE ABSENCE OF DIRECT LINE OF SIGHT

(76) Inventor: Valentin Makotinsky, 1781 Riverside Dr., New York, NY (US) 10034

( * ) Notice: Subject to any disclaimer, the term of this patent is extended or adjusted under 35 U.S.C. 154(b) by 0 days.

(21) Appl. No.: 11/054,313

(22) Filed: Feb. 10, 2005

(51) Int. Cl.
*G01C 15/00* (2006.01)

(52) U.S. Cl. ............................ 33/286; 33/228; 33/293; 33/1 CC

(58) Field of Classification Search ............... 33/276, 33/277, 278, 279, 280, 286, 290, 293, 299, 33/645, 1 G, 1 T, 1 BB, 1 CC, 288; 359/515, 359/520, 811, 877; 52/749.1, 749.11; 356/247, 356/253, 254, 255

See application file for complete search history.

(56) References Cited

U.S. PATENT DOCUMENTS

| | | | | |
|---|---|---|---|---|
| 3,230,377 A | * | 1/1966 | Smith ...................... | 250/203.6 |
| 3,559,303 A | * | 2/1971 | Vickery .................... | 434/291 |
| 3,588,255 A | * | 6/1971 | Alexander ............... | 356/152.1 |
| 3,716,923 A | * | 2/1973 | Bazhaw ..................... | 33/264 |
| 3,726,600 A | * | 4/1973 | Carmack et al. .......... | 356/253 |
| 3,876,313 A | * | 4/1975 | Messler et al. ........... | 356/255 |
| 3,914,029 A | * | 10/1975 | Hoplock ................... | 359/876 |

(Continued)

FOREIGN PATENT DOCUMENTS

EP 481307 A * 4/1992

(Continued)

OTHER PUBLICATIONS

SECO Surveying Products, Double Right Angle Prism, SECO Part No. 4900-00, 1 page printout from the company's web site: www. surveying.com SECO Manufacturing, Inc. 4155 Oasis Road, Redding, CA 96003.

(Continued)

*Primary Examiner*—R. Alexander Smith
(74) *Attorney, Agent, or Firm*—Boris Leschinsky

(57) ABSTRACT

A method and remote-controlled reflector device for layout reference and axis lines is provided for use preferably in high building construction industry. The reflector device includes a mirror capable of rotating about its horizontal and vertical axes as controlled by an instrument man standing with a remote controller and a theodolite at a first location, such as on the ground or a lower floor of the building. The reflector device is positioned over the edge of a floor of a building under construction such as to be in direct view from both the first location and the second location where the new axis line marking are to be placed by the rod man. The mirror is first rotated by the instrument man such as to reflect the view from the theodolite back upon itself to verify its proper alignment with the base axis line. The instrument man then remotely rotates the mirror towards the second location such that the inflected line of sight is formed from the theodolite through the mirror defining an inflection point and advises the rod man where to place the mark for the new axis line. The procedure is then repeated at other locations as needed. The method allows more precise and safe transfer of lines without the need for the rod man to stand close to the edge of the building. Proper verification of the existing layouts is also described.

6 Claims, 4 Drawing Sheets

U.S. PATENT DOCUMENTS

| | | | |
|---|---|---|---|
| 4,029,415 A | | 6/1977 | Johnson |
| 4,082,466 A | | 4/1978 | Underberg |
| 4,162,124 A | * | 7/1979 | Feldman et al. ............ 356/3.15 |
| 4,340,271 A | * | 7/1982 | Robinson et al. ........... 359/555 |
| 4,400,888 A | | 8/1983 | Strom |
| 4,413,907 A | * | 11/1983 | Lane .................... 356/139.05 |
| 4,510,695 A | * | 4/1985 | Leitz ........................... 33/293 |
| 4,650,324 A | | 3/1987 | Underberg |
| 4,717,251 A | | 1/1988 | Wells |
| 4,907,879 A | | 3/1990 | Webb |
| 5,027,521 A | * | 7/1991 | Del Giorgio ................. 33/281 |
| 5,084,980 A | * | 2/1992 | Skopec et al. ................ 33/286 |
| 5,272,814 A | | 12/1993 | Key |
| 5,313,409 A | | 5/1994 | Wiklund et al. |
| 5,331,395 A | | 7/1994 | Piske et al. |
| 5,959,792 A | * | 9/1999 | Ibrahim ..................... 359/872 |
| 6,256,895 B1 | | 7/2001 | Akers |
| 6,588,868 B1 | | 7/2003 | Skultety-Betz |
| 6,665,985 B1 | * | 12/2003 | Hennes ............................ 52/7 |
| 6,675,122 B1 | * | 1/2004 | Markendorf et al. ........ 702/150 |
| 2006/0023203 A1 | * | 2/2006 | Gatsios et al. ......... 356/139.01 |

FOREIGN PATENT DOCUMENTS

| | | | | |
|---|---|---|---|---|
| GB | 2246208 A | * | 1/1992 | |
| JP | 01088309 A | * | 4/1989 | |
| JP | 04011534 A | * | 1/1992 | |

OTHER PUBLICATIONS

Guider 1-40, product information printout from the company's web site: www laseroptronix.se—Guider 1-40 the smart leveling instrument.

* cited by examiner

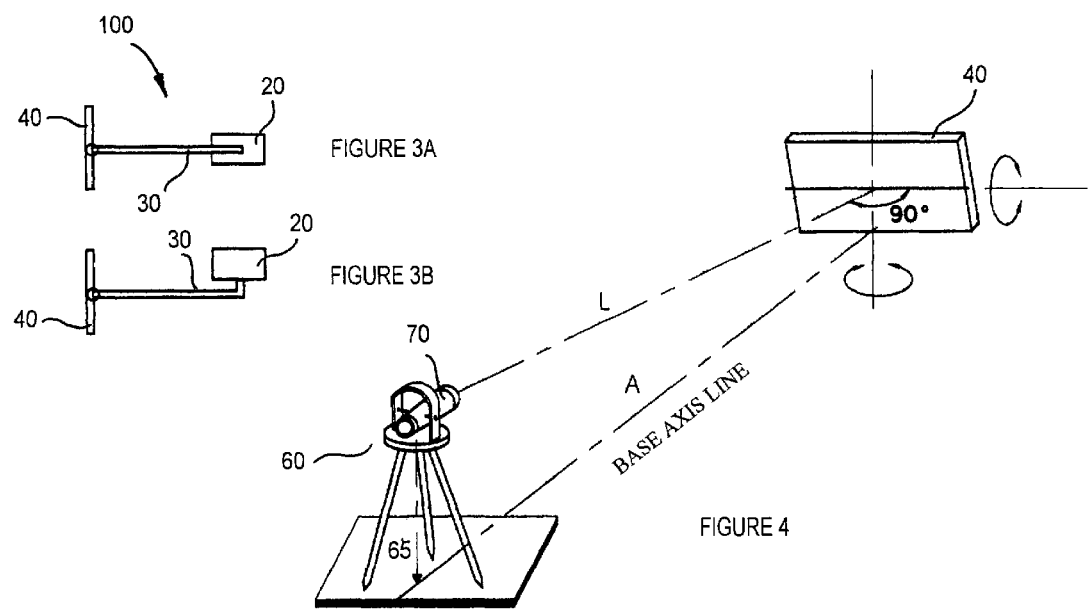

METHOD AND REMOTE-CONTROLLED REFLECTOR DEVICE FOR LAYOUT AXIS LINES DURING CONSTRUCTION OF A BUILDING IN THE ABSENCE OF DIRECT LINE OF SIGHT

BACKGROUND OF THE INVENTION

The present invention relates generally to marking devices and methods for land surveying and building construction. More particularly, the device and method of the invention utilizes a remote-controlled mirror device to deflect the line of sight or beam pathways of leveling devices. That in turn allows easier and safer transfer of the axis lines of a multi-story building under construction from one floor to the next as well as over any other obstacles to a direct line of sight.

During the building construction, the main objective of the operator is to mark down the axis lines of the future building. This step of layout is typically conducted before the actual excavation and building construction begins. Various well-defined objects are used as basis for the markings such as existing nearby buildings, previously marked property lines, etc.

It is a common practice to layout the axis lines of the building outside the actual construction zone so as to preserve them from disturbance during the actual work. First, the lower walls of the nearby buildings or nearby paved roads or pedestrian walks are used to place the initial marks. Then, a first set of horizontal axis lines A is established by connecting these initial marks, see FIG. 1. Finally, the second set of horizontal marks B perpendicular to the first set A is established by using the first set A as a base as well as another building or a well-defined object if available. Therefore the entire set of horizontal markings and lines is available as a reference system for subsequent positioning the corners, pillars, foundation borders and other elements of the future building. FIG. 1 shows the position of the future column K at the intersection of the axis lines A and B.

It is critical to be as precise as possible during this initial layout operation as well as subsequent layout of various floors of the building. Typically, the maximum deviation allowed is not more than plus or minus one eighth to one quarter of an inch.

Building construction and land surveying devices are well known in the prior art. One such typical instrument is an odolite also known as theodolite, which is used in the field to obtain precise angular and distance measurements for highway construction, industrial plant layout, tunnel construction and alignment, and other civil engineering work. Other known instruments, such as the Electronic Distance Measuring (EDM) Device may be used to determine the distance between the instrument and any randomly located field point or survey station within its effective range. In working with the known instruments in land surveying operations, it is necessary for both the instrument station and the random field location to be manned by one or more members of the survey crew. In a known manner, the crew is able to manually align the instrument with the field location so that the various required angular and linear measurements may be made. It is apparent that this alignment procedure is time-consuming and requires the combined effort of several different individuals at different locations in the area to be surveyed.

The following United States patents illustrate the state of the art in surveying instruments; U.S. Pat. No. 3,653,774 (La Roche); U.S. Pat. No. 3,469,919 (Zellner); U.S. Pat. No. 4,107,530 (Brumfield et al); U.S. Pat. No. 4,425,043 (Van Rosmalen); U.S. Pat. No. 2,836,894 (Wagner); U.S. Pat. No. 3,580,687 (Hansen); U.S. Pat. No. 4,279,036 (Pfund); U.S. Pat. No. 4,466,189 (Tobin, Jr.); U.S. Pat. No. 4,457,621 (Harris et al); U.S. Pat. No. 4,470,698 (Green, Jr. et al); and U.S. Pat. No. 3,989,942 (Waddoups).

The LaRoche patent (U.S. Pat. No. 3,653,774) discloses a theodolite including a servo-motor used for tracking a moving target. It does not disclose on-command alignment in a land surveying procedure. The Zelner patent (U.S. Pat. No. 3,469,919) discloses an electronic surveying instrument including a laser beam projector coupled with an angled mirror to produce horizontal datum. The disclosed device also includes a receiver for receiving reflected beams to detect a datum plane and a pair of adjustable antennas which are movable to an elevation intersecting the datum plane and adjustable to insure proper spacing and elevation of the antennas.

The Wagner patent (U.S. Pat. No. 2,836,894) discloses a theodolite useful for tracking moving objects. It does not disclose a remotely controlled land surveying assist device for aligning on-command the same with a remote field location. The Hansen patent (U.S. Pat. No. 3,580,687) discloses a surveying instrument, which detects when it is misaligned, but it provides no means for on-command alignment.

The Pfund patent (U.S. Pat. No. 4,279,036) discloses a communication system with mobile vehicles including the use of a satellite; the Tobin, Jr., patent (U.S. Pat. No. 4,466,189) discloses an optical sensor used as a navigation aid for fixing and maintaining an accurate site on a target during rough water conditions; the Harris et al patent (U.S. Pat. No. 4,457,621) discloses a surveillance system including a laser range finder for use in conjunction with a passive surveillance scanner; and the Green, Jr., et al patent (U.S. Pat. No. 4,470,698) discloses a scanning and/or tracking mechanism for use as part of either an optical obstacle avoidance or target tracking airborne radar set. It is apparent that none of the last four mentioned patents disclose instruments useful for land surveying operations.

The Webb patent (U.S. Pat. No. 4,907,879) provides a remote-controlled land surveying assist device capable of aligning the path of the beam horizontally as directed by an operator from a remote location. Alignment is achieved when the incoming beam is reflected back towards the source thereof. It does not have the capability to change the beam pathway vertically in a useful way as described in detail below.

The LASEROPTRONIX Company (Stockholm, Sweden) markets the device called GUIDER 1-40 as described on the web site of the company, www.laseroptronix.se. This device incorporates a mirror hanging in a self-aligning holder. The holder is equipped with a plumb and that makes the mirror always vertically oriented.

Finally, the Piske patent (U.S. Pat. No. 5,331,395) describes an instrument for aligning a laser-leveling device along a building line by swinging the head of the instrument containing a rotating prism.

The term "theodolite" is used throughout this description to include broadly various surveying optical devices as well as sources of light beams such as laser etc. In a typical theodolite 60 (see FIG. 4), one of the main elements is an optical telescope 70, capable of swinging in a horizontal and vertical planes. It is also equipped with a vertical optical plumb 65 aligned with the vertical axis of the telescope. Manually operated plumbs are used by the operators or members of the surveying crew to transfer the axis lines from one floor of the building to the next.

As the building construction progresses, the axis lines are first transferred from the surface into the excavated area for layout of the foundation of the building, then to the first floor, then to the second floor as these floors are erected and so on. Typically, two operators conduct such transfer. The first operator 50, also referred to as an instrument man, is located at the ground surface and uses the theodolite 60, as shown on FIG. 2B. The second operator 80, also referred to as a rod man, is standing at the top existing floor 10 of the building and holds vertically the plumb 85. The instrument man 50 positions the theodolite 60 on the base axis line, aligns it vertically by using the internal optical plumb and then observes the rod man 80 with the plumb 85. The instrument man 50 advises the rod man 80 (verbally or by radio) as to how the rod man 80 shall move such that the plumb 85 is aligned with the axis line on the ground as can be observed through the telescope of the theodolite 60. Once that is achieved, the rod man 80 is advised to place a mark on the floor to indicate the proper position of the new axis line. The same procedure is then repeated from the other side of the building and the second mark is placed on the floor. The two marks are then connected to form a new axis line. Other axis lines are transferred in a similar manner. Intersections of axis lines mark the places for main pillars of the building. Once the construction of the floor is finished, the same procedure is repeated again to layout the next floor of the building.

This method of transferring the reference lines from the ground to the next floor under construction is sufficient for buildings having a maximum of 10–12 floors. For buildings of greater height this method is not practical and may present significant errors because of the following limitations:
- the theodolite scope has to be risen too steeply for upper floors of the building, which increases the tilt error of the instrument to an unacceptable value;
- the distance between the instrument man and the rod man gets to be too great to the point that the instrument man can hardly see the plumb bob string;
- the natural swing of the building becomes too high. For a 30–40 floor building, the swing can be as high as a one-half to ⅜ inches, and can be further increased by wind factor and working cranes; and
- the scope reticals projected on the site are to be scaled into ¼ to ½ inch.

It would be therefore desirable to have a reliable method to transferring the axis lines from one floor to the next with optional reference to the common control (so as to verify accuracy) for all buildings including high-risers.

Another problem with the traditional method is that both operators have to have a direct line of sight causing the rod man to stand too close to the edge of the building and creating a safety concern. It would be desirable not to have the direct line of sight and allow the rod man step back further inside the building during the layout procedure so as to improve the safety of construction process.

None of the known devices and methods of the prior art allow for these objectives to be achieved. The need exists therefore for a device and method allowing the transfer of the axis lines from one floor to the next floor of the building under construction as well as to allow the rod man to remain far enough from the edge of the floor to improve his safety. The need also exists generally for a device allowing the transfer of a desired point of reference to another point of reference when there is no direct line of sight between the two points, such as when there is an obstacle of some sort or a non-transparent object, which cannot be moved easily out of the way.

SUMMARY OF THE INVENTION

Accordingly, it is an object of the present invention to overcome these and other drawbacks of the prior art by providing a novel method and device for layout a line in a new location based on a line in a reference location without the direct line of sight between two locations.

It is another object of the present invention to provide a remote-controlled device allowing alignment of the line of sight between two desired points by reflecting it through an adjustable mirror.

It is a further object of the present invention to provide a marking device allowing a member of the surveying crew to stand safely inside the boundaries of the floor of the building during the layout procedure.

The method and device of the invention are based on a remote-controlled optical reflector allowing changing the direct straight line of sight into two lines with an inflection point therebetween at the location of the reflector device. Specifically, a mirror is mounted on a remote-controlled servomotor with the ability to change its horizontal and vertical orientation. The reflector device is positioned beyond the edge of the building under construction such that the mirror of the device is placed at the appropriate angle to establish a first direct line of sight with the instrument man located for example on another floor. At the same time, a second line of sight is established with a rod man standing well inside the perimeter of the next floor.

The instrument man can then position the theodolite on the base axis line and control the mirror orientation and advise the rod man by radio as to where to stand such that the plumb can be used to layout the location of the new axis line on that floor. The rest of the procedure is the same as described above.

The reflector device of the invention can be used in a method allowing verifying the position of a new reference point based on the initial reference point without a direct line of sight between the two points. The reflector is positioned above the obstacle to the direct line of sight and the mirror is oriented remotely by the instrument man to establish an inflected or bent line of sight over the obstacle as will be described in more details below.

BRIEF DESCRIPTION OF THE DRAWINGS

A more complete appreciation of the subject matter of the present invention and the various advantages thereof can be realized by reference to the following detailed description in which reference is made to the accompanying drawings in which:

FIG. 3A is the side view of the reflector device of the invention, FIG. 3B is the top view of the same, FIG. 4 is a general schematic view showing the respective position of the theodolite and the rotating mirror of the reflector adjusted to the base axis line, and finally

DETAILED DESCRIPTION OF THE PREFERRED EMBODIMENT OF THE INVENTION

A detailed description of the present invention follows with reference to accompanying drawings in which like elements are indicated by like reference letters and numerals.

Figure 1:
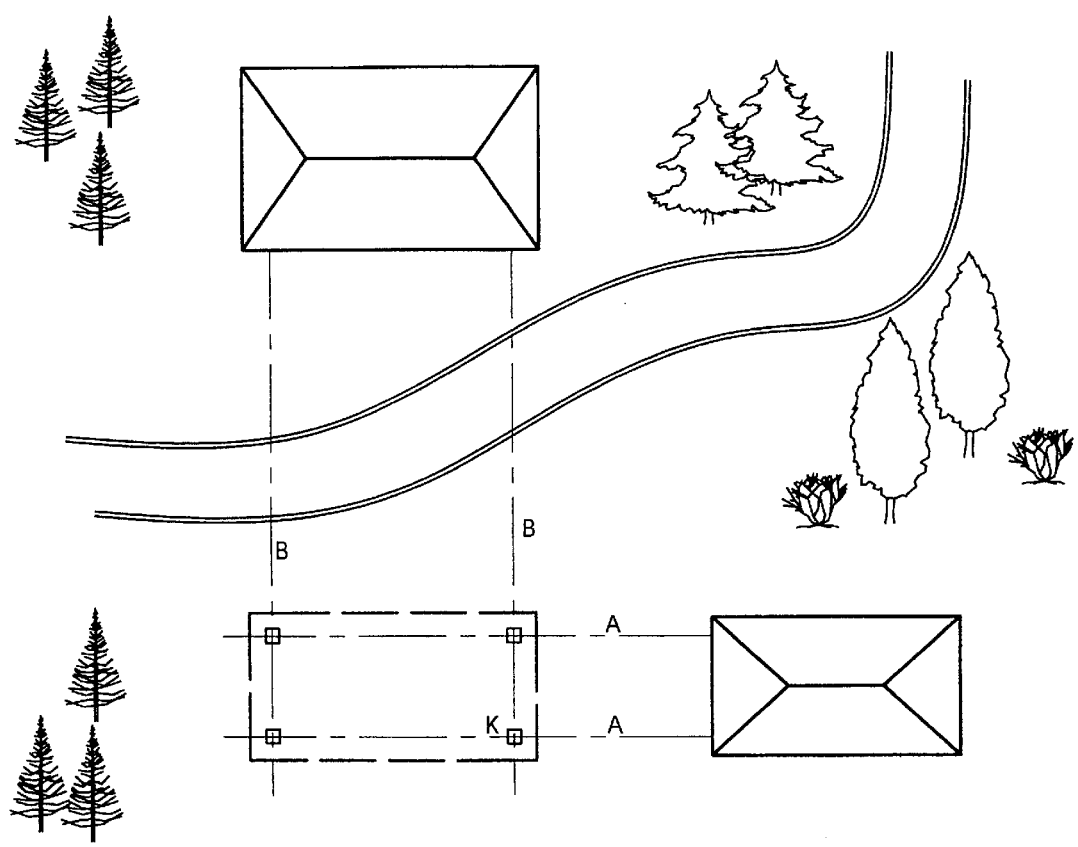
FIG. 1 is a general view of the perpendicular axis lines on a construction site in reference to nearby objects.
Figures 2A, 2B:
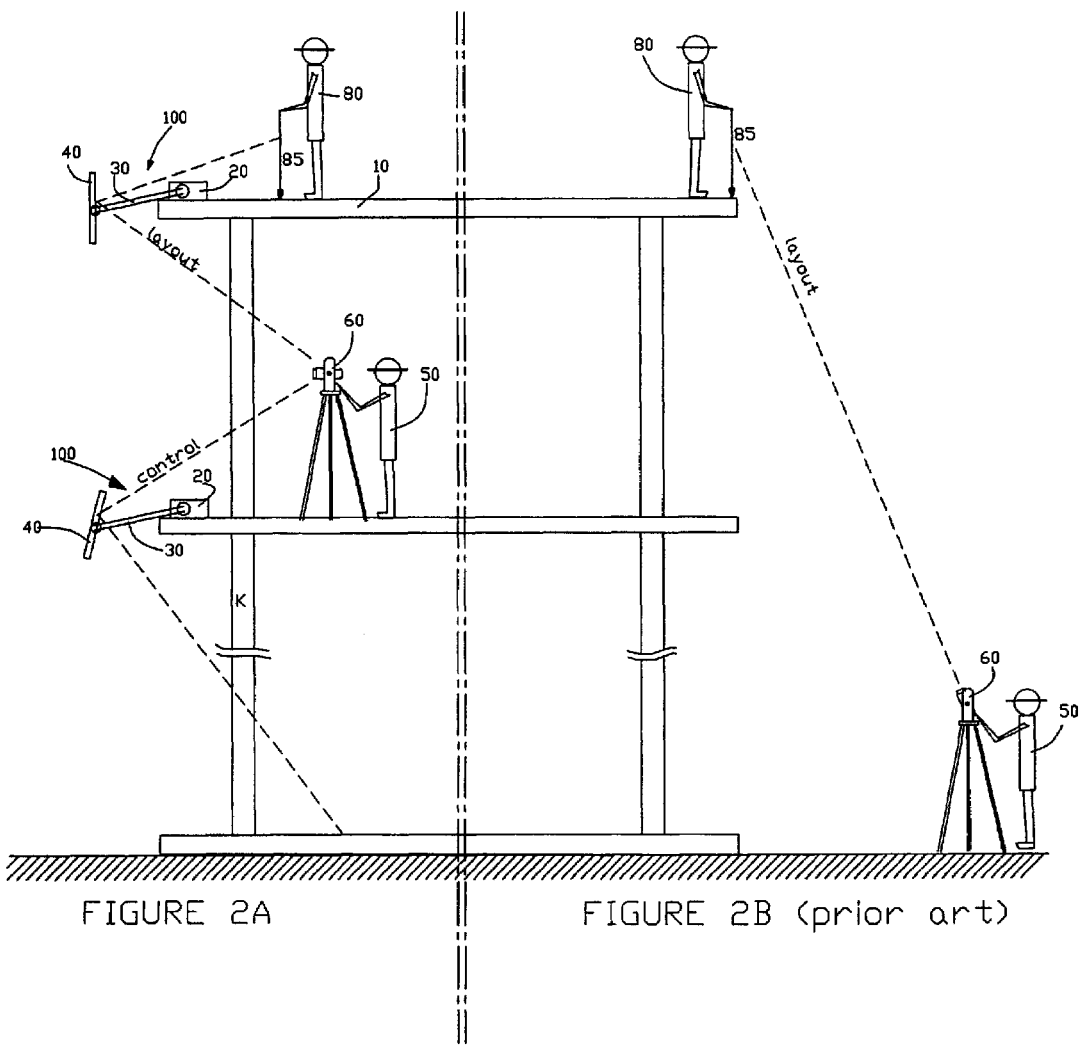
FIG. 2A is a side view of the use of the reflector device of the invention according to the new method of the invention to layout a new reference line on the next floor of the building under construction or to check the existing line against the control.
FIG. 2B illustrates a prior art method of transferring the axis lines from the ground to the desired floor of a building using a theodolite.

FIG. 1 illustrates the general location of the axis lines of a building under construction in relation to other objects nearby. FIG. 2A illustrates the use of the reflector device 100 according to the method of the invention. It is based on the general procedure of transfer of axis lines as described above. The general schematic depiction of the reflector device 100 is shown on FIG. 3A and FIG. 3B and includes a base equipped with a remote-controlled servomotor drive 20, an extension pipe 30 containing an position adjustment means, and a mirror 40 capable of rotating about its horizontal and vertical axis.

The remote-controlled drive 20 can be made as a mechanically (spring-loaded, telescopic), manually, pneumatically, hydraulically or electrically driven stand-alone apparatus driving the position adjustment means through a pipe 30. The control of the drive 20 can be made using a radio signals, as well as a wire transmitted electrical signals. Infrared, sound, light or other types of well-known remote controller systems may also be advantageously used for the purposes of the invention. The remote controller unit is preferably located with the instrument man 50 standing next to the theodolite 60. The drive 20 can be powered by batteries or AC line if available. It preferably consists of two electrical motors, one to adjust the horizontal position of the mirror 40 and the other to independently adjust the vertical position thereof.

In an alternate configuration also contemplated as part of the invention (not shown on the drawings), the base 20 serves only as a passive attachment element to place the device in close vicinity to the proper final position. The remote-controlled drive is contained entirely within the housing of the mirror 40 and is used for final positioning of the mirror. The advantage of that arrangement is that no power drive is extended through the pipe 30, which in that case comprises a simple telescopically extended adjustable support base for the mirror unit 40.

Critically for the purpose of this invention, the mirror 40 should have the ability of at least be rotated about its horizontal axis but preferably about both the horizontal and vertical axes. Many well-known transmission mechanisms may be used as a position adjustment mechanism and still fit inside the pipe 30. An automobile side mirror position adjustment means activated by a button inside the car cabin is one example of such means useful for the purposes of this invention. Other example are also contemplated such as a rotating rod mechanism. The reciprocal back and forth movement of such rod may be used to control the position of the mirror in one plane (such as a horizontal plane) while it rotation clockwise and counterclockwise may control the position of the mirror in another plane (such as a vertical plane) perpendicular to the first plane. Activation of the position adjustment means by the servomotor can be achieved using compressed air, fluid, mechanical spring or other similar sources of energy available in the field. Hand-activated crank mechanisms to store appropriate reserve of energy for use in remote locations are also contemplated.

Importantly, the servomotor drive 20 is capable of changing the position of the mirror 40 through the pipe 30 in such a way that the mirror 40 can swing vertically in the preferred range of 180 degrees and horizontally in the preferred range of 90 degrees as shown on FIG. 4 relative to the optical line of sight L of the telescope 70 of the theodolite 60.

Since it is important to position the reflector device 100 such that the planes of rotation of the mirror 40 are strictly oriented vertically and horizontally rather than at some other angle, optional provisions are contemplated to insure proper orientation of the servomotor drive 20 (not shown on the drawings). One such provision is a dedicated internal optical plumb aligned with the axes of rotation of the mirror 40, similar to that of the theodolite 60. Another provision to make it easier to orient the drive 20 and the corresponding mirror 40 is the set of three legs adjustable in length, again similar to that of the theodolite.

In use for building construction and in accordance with the first method of the invention, initial axis lines are placed with reference to the nearby objects as shown on FIG. 1 and described in greater detail above. Initial axis lines usually comprise a first set of parallel axis lines A and a second set of parallel axis lines B perpendicular to lines A. These two sets typically define the edges of the rectangular building as well as locations of the corner columns K.

FIG. 2A shows two methods of using the reflector device of the invention. According to the first method, the following steps are undertaken to transfer the base axis line from one floor to the next:

a. position the theodolite on the base axis line such that its vertical axis is aligned with the base axis line;

b. position the reflector device of the invention about the edge of the floor separating the location of the instrument man and the rod man;

c. manually extend and adjust the position of the pipe 30 such that the mirror 40 is placed in the field of view of the theodolite as observed by the instrument man;

d. rotate (preferably through remote-controlled means) the mirror 40 about its vertical axis until the instrument man observes the alignment of the vertical axis of the theodolite (vertical mark on its retical) through the mirror 40 serving as an inflection point with the base axis line;

e. rotate the mirror 40 about its horizontal axis to position the location of the rod man in the field of theodolite view as reflected through the mirror 40;

f. advise the rod man as to how to mark the new reference line to be aligned with the vertical axis of the theodolite and therefore with the base axis line.

The device of the invention also allows the instrument man to verify the location of any reference line about a control reference. Only one worker is needed do this procedure. To do that, the following steps are taken:

a. position the theodolite on the reference line in question such that the vertical axis of the theodolite is aligned therewith;

b. position the reflector device of the invention about the edge of the floor separating the location of the instrument man and the control line;

c. manually extend and adjust the position of the pipe 30 such that the mirror 40 is placed in the field of view of the theodolite as observed by the instrument man;

d. rotate the mirror 40 about its vertical axis until the instrument man observes the alignment of the vertical axis of the theodolite (vertical mark on its retical) through the mirror 40 serving as an inflection point with the reference line in question;

e. rotate the mirror 40 about its horizontal axis until the control line is seen in the field of theodolite view as reflected through the mirror 40;

f. verify alignment of the vertical axis of the theodolite and control line so that the alignment of the reference line and the control lines are confirmed.

Figure 5:
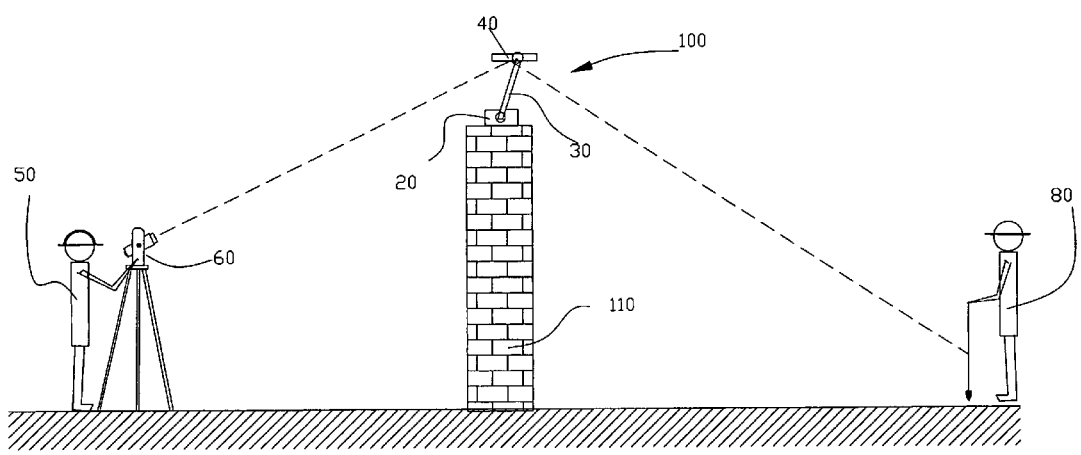
FIG. 5 is a general view illustrating the method of the invention allowing extension of the existing reference line through a non-transparent obstacle precluding a direct straight line of sight between the two points.

In a variation of the first method of the invention, it is possible to transfer the axis line beyond the non-transparent obstacle 110 such as a fence or a wall as shown on FIG. 5 in greater detail. The theodolite 60 is first positioned on the initial reference line by the instrument man 50. The reflector device 100 is placed on the obstacle 110 such that the mirror 40 is positioned above the obstacle 110 and in direct view of the telescope 70 of the theodolite 60. The mirror 40 is first positioned to reflect back the view from the theodolite (as described in more detail above) to make sure it is placed correctly and then rotated about its horizontal axis towards the area of interest on the other side of the obstacle 110. The instrument man 50 then advises the rod man 80 by radio as to how to position the plumb 85 to bring it into the view of the theodolite 60 and in alignment with its vertical axis. The rod man 80 is then advised to layout the spot on the ground, which is aligned with the base axis line.

In comparison with the traditional devices and methods, the above described device and method of the invention allow to transfer the axis lines with greater precision and better safety for the surveying crew. It also allows verification of the axis lines between various floors of the building and transfer thereof over a non-transparent obstacle.

The invention may be used advantageously not only in the construction industry but also throughout various land-surveying applications known from the prior art. Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of transferring a base axis line from a first location to a second location over a non-transparent object obstructing a direct line of sight between said first location and said second location, said method comprising the steps of:
   a. providing a theodolite positioned at the base axis line at the first location,
   b. providing a remote-controlled reflector device including a mirror positioned over said object at a location aligned with the base axis line of the first location, said mirror having a direct line of sight with said first location and said second location, said mirror having a horizontal axis of rotation,
   c. rotating said mirror about its horizontal axis of rotation to direct the line of sight of said theodolite towards the desired area of the second location, and
   d. marking the new axis line at said second location based on an inflected line of sight from said theodolite through said mirror defining an inflection point and guidance from said first location so as to align said new axis line with said base axis line.

2. The method as in claim 1, wherein said step (b) further including verifying the alignment of said mirror with said base axis line of the first location by remotely rotating said mirror about its horizontal axis to reflect the view from said theodolite to observe said base axis line to be aligned with said theodolite.

3. The method as in claim 2, wherein said reflector device is provided to allow adjustment of the position of said mirror about both the horizontal and vertical axes, said step (b) further including rotating the mirror about both its axes of rotation in order to reflect the view from said theodolite back upon itself.

4. The method as in claim 1, wherein said first location is at a ground level or a lower floor and said second location is at a floor of a building under construction, said non-transparent object being an edge of said floor.

5. The method as in claim 1, wherein said first location and said second location are on the same horizontal surface, said non-transparent object is an obstacle precluding a direct line of sight between the two locations.

6. A method of verifying a proper location of an axis line at a second location relative to a control line at a first location over a non-transparent object obstructing a direct line of sight between said first location and said second location, said method comprising the steps of:
   a. providing a theodolite positioned at the axis line at the first location,
   b. providing a remote-controlled reflector device including a mirror positioned over said object at a location aligned with the axis line of the first location, said mirror having a direct line of sight with said first location and said second location, said mirror having a horizontal axis of rotation,
   c. rotating said mirror about its horizontal axis of rotation to direct the line of sight of said theodolite towards the desired area of the second location, and
   d. verifying the proper location of the axis line at said second location if aligned with the control line at the first location as viewed by said theodolite via an inflected line of sight from said theodolite through said mirror defining an inflection point and to said control line.

* * * * *